(12) United States Patent
Gupta (10) Patent No.: US 8,706,631 B2
(45) Date of Patent: Apr. 22, 2014

(54) CREDIT AND TRANSACTION SYSTEMS

(75) Inventor: Pankaj Gupta, Redwood City, CA (US)

(73) Assignee: Sound Starts, Inc., Aromas, AZ (US)

( * ) Notice: Subject to any disclaimer, the term of this patent is extended or adjusted under 35 U.S.C. 154(b) by 742 days.

(21) Appl. No.: 12/053,447

(22) Filed: Mar. 21, 2008

(65) Prior Publication Data

US 2008/0281726 A1  Nov. 13, 2008

Related U.S. Application Data (60) Provisional application No. 60/919,814, filed on Mar. 22, 2007, provisional application No. 60/915,214, filed on May 1, 2007, provisional application No. 60/951,778, filed on Jul. 25, 2007, provisional application No. 60/979,457, filed on Oct. 12, 2007.

(51) Int. Cl.
*G06Q 40/00* (2012.01)

(52) U.S. Cl.
CPC .................. *G06Q 40/00* (2013.01)
USPC ........... 705/44; 705/35; 705/37; 705/39; 705/40; 705/26.1; 705/45; 705/34; 707/709; 455/407; 455/406

(58) Field of Classification Search
USPC ............ 705/39, 40, 26.1, 45, 35, 34, 38; 455/407; 707/709
See application file for complete search history.

(56) References Cited

U.S. PATENT DOCUMENTS

| | | | |
|---|---|---|---|
| 7,606,764 B1 * | 10/2009 | Mancini | 705/39 |
| 2002/0069158 A1 * | 6/2002 | Larkin et al. | 705/38 |
| 2002/0194122 A1 * | 12/2002 | Knox et al. | 705/39 |
| 2003/0135451 A1 * | 7/2003 | O'Brien et al. | 705/38 |
| 2003/0229582 A1 * | 12/2003 | Sherman et al. | 705/38 |
| 2004/0044616 A1 * | 3/2004 | Salter | 705/38 |
| 2006/0287929 A1 * | 12/2006 | Bae et al. | 705/26 |
| 2007/0033135 A1 * | 2/2007 | Wokaty, Jr. | 705/38 |
| 2007/0045406 A1 * | 3/2007 | Giesen et al. | 235/380 |
| 2007/0061255 A1 * | 3/2007 | Epting et al. | 705/39 |
| 2007/0244797 A1 * | 10/2007 | Hinson et al. | 705/37 |
| 2008/0015954 A1 * | 1/2008 | Huber et al. | 705/28 |

* cited by examiner

*Primary Examiner* — Tien Nguyen
(74) *Attorney, Agent, or Firm* — Donald R. Boys; Central Coast Patent Agency, Inc (57) ABSTRACT

An Internet-coupled transaction service has a link to a computer appliance coupled to a merchant site, the computer appliance operated by a person who has selected one or more products or services to purchase at the merchant site, and who has selected, through the merchant site, the transaction service to arrange payment, and software executing from a computer-readable medium accessible to the service. The transaction service, via the software verifies the identity of the person, determines a credit worthiness for the person, and the score being sufficient, arranges payment to be made to the merchant on behalf of the person, and arranges repayment terms with the person for the payment to the merchant.

10 Claims, 6 Drawing Sheets

CREDIT AND TRANSACTION SYSTEMS

CROSS-REFERENCE TO RELATED APPLICATIONS

The present application claims priority to four provisional patent applications, being Ser. No. 60/919,814 filed Mar. 22, 2007, Ser. No. 60/915,214 filed May 1, 2007, Ser. No. 60/951,778 filed Jul. 25, 2007, and Ser. No. 60/979,457 filed Oct. 12, 2007. The disclosure of all four provisional applications is incorporated in the present case at least by reference.

BACKGROUND OF THE INVENTION

1. Field of the Invention

The present invention is in the area of network transacting systems in general, including credit and payment aspects of transactions, and pertains in some embodiments more specifically to such systems for matching purchasers with credit vendors, arranging and managing transactions, and provision for payments and settling of debt balances.

2. Description of Related Art

It is well-known that a person seeking to purchase products or services may use cash, a credit card or a debit card to pay the seller, or may arrange with the seller a contract for payment over time. A purchaser in some instances may also arrange for an advance from a credit source, such as a finance company, to pay the vendor the purchase price, and then may repay the finance source according to pre-arranged terms. Also, in many cases, especially those involving large enterprises like department stores and the like, the store itself may issue a credit card, or may have other sorts of credit arrangements to offer, perhaps pre-arranged with certain financial institutions. A good example is a car dealership which may have pre-arrangements with banks and loan companies. The car dealer may guide and facilitate credit arrangement for a potential buyer.

Even with all of these services available, there are still drawbacks and unmet needs. Credit cards typically have fixed interest rates and payment requirements. Also, in arrangement with purchases at greater amounts than most credit cards will provide, with banks and loan companies for example, takes time, and the credit risk for the lender must be determined, which usually happens through well-known credit tracking companies, such as Equifax, for example. Even after a purchaser's credit worthiness is determined, it is still often necessary for a credit application and a contract to be prepared and executed.

Currently sellers of goods and services, either through "brick and mortar" stores or network-based, such as in the Internet, have no way to process consumer transactions in a way that is analogous to business transactions. When a merchant makes a business transaction the merchant typically bills the business for the goods or services rendered, typically with Net 30 terms. If the business entity does not pay by end of the term, i.e. 30 days, then the businesses are usually charged interest.

What is clearly needed are systems whereby merchants may very quickly and with assurance assess credit worthiness of potential buyers, and once that worthiness is established, partner the potential buyers with one or more of a plurality of credit vendors who may compete for the business, all arrangements being done quickly and substantially at the point of purchase.

BRIEF SUMMARY OF THE INVENTION

The present inventor, being aware of the growth of Internet commerce even in the face of reluctance by many otherwise willing customers to share credit card information on the Internet, has devised a service that provides credit to worthy customers without a need for the customers to provide credit card information.

In one embodiment of the invention an Internet-coupled transaction service is provided, comprising a link to a computer appliance coupled to a merchant site, the computer appliance operated by a person who has selected one or more products or services to purchase at the merchant site, and who has selected, through the merchant site, the transaction service to arrange payment, and software executing from a computer-readable medium accessible to the service. The transaction service, via the software verifies the identity of the person, determines credit worthiness for the person, and if the person is determined to be credit worthy, offers to arrange a payment to be made to the merchant on behalf of the person, and if the person selects the offering the transaction service arranges repayment terms with the person for the payment to the merchant.

In another aspect of the invention an Internet-coupled transaction service is provided, comprising a link to a merchant server coupled to an interactive transaction interface in a physical retail store, the transaction interface operated by an employee of the retail store for managing sales transactions for products or services offered for sale by the retail store, and selected for purchase by a customer in the retail store, and software executing from a computer-readable medium accessible to the service. Details of the purchase and identification information for the customer are entered at the interactive interface, and the transaction service, via the software verifies the identity of the customer, determines a credit worthiness score for the customer, and the score being sufficient, arranges payment to be made to the merchant on behalf of the customer, and arranges repayment terms with the customer for the payment to the merchant.

In yet another aspect of the invention a method for managing transactions is provided, comprising steps for (a) at an Internet-connected transaction service linked to an appliance (typically a PC) operated by a person also linked to an Internet merchant site, the person having selected via a browser executing in the appliance (a PC), one or more products or services offered for sale at the Internet merchant site, determining credit worthiness for the person; (b) upon the credit worthiness being sufficient, arranging payment to be made to the merchant on behalf of the person; and (c) arranging repayment terms with the person for the payment made to the merchant.

In still another aspect of the invention a method for managing transactions is provided comprising steps for (a) at an Internet-connected transaction service linked to a merchant server coupled to an interactive transaction interface in a physical retail store which is an outlet for the merchant, the transaction interface operated by an employee of the retail store for managing sales transactions for products or services offered for sale by the retail store, and selected for purchase by a customer in the retail store, determining credit worthiness for the customer; (b) upon the credit worthiness being sufficient, arranging payment to be made to the merchant on behalf of the person; and (c) arranging repayment terms with the person for the payment made to the merchant.

DETAILED DESCRIPTION OF THE INVENTION

The present invention in one embodiment allows merchants to enable their consumer purchasers (buyers/customers) to establish credit in near real-time when making a purchase.

Figure 1:
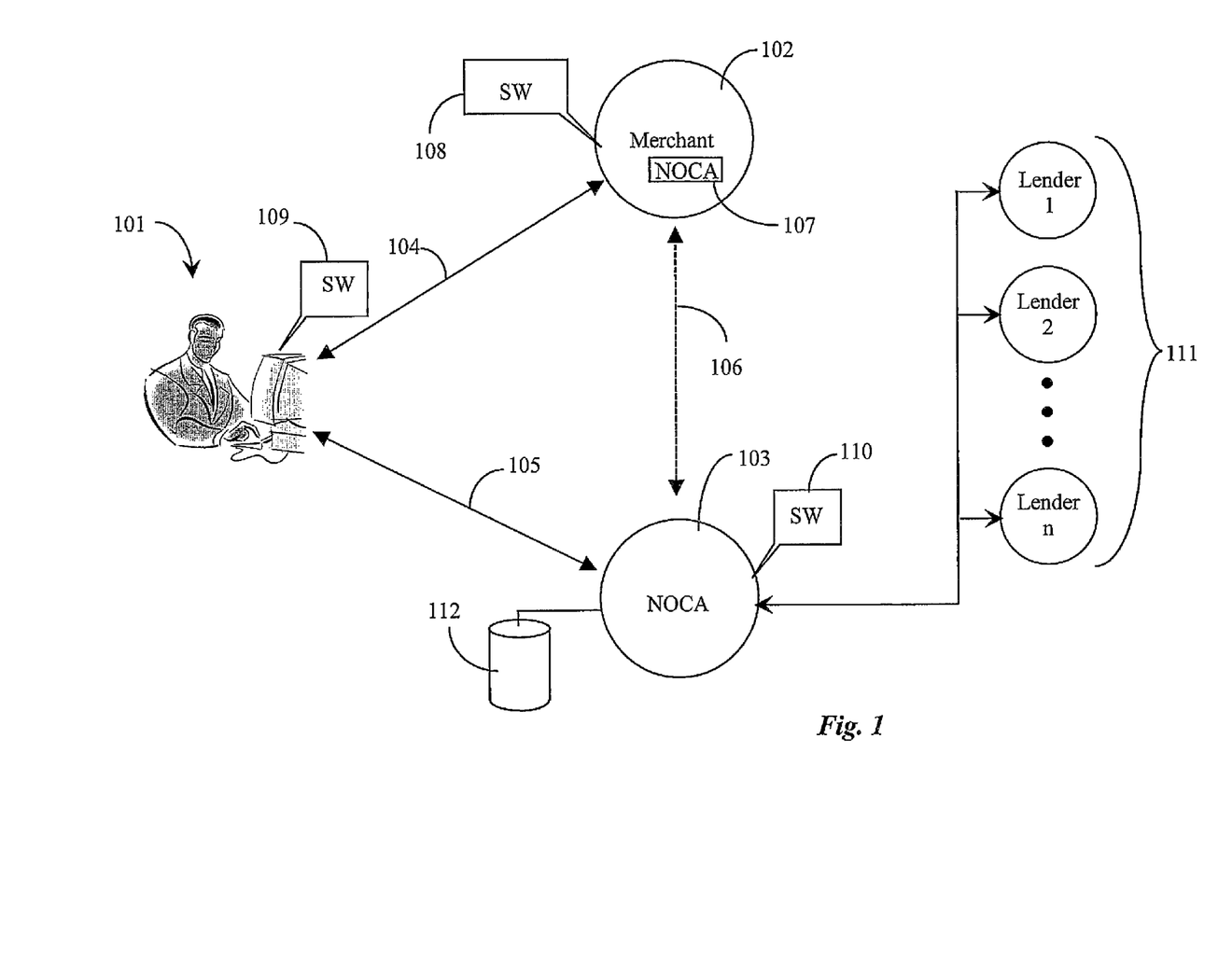
FIG. 1 is a high-level architectural diagram for practicing the invention in one embodiment.

FIG. 1 is a high-level architectural diagram illustrating how the invention may be practiced in one embodiment. In FIG. 1 a buyer 101 has established an Internet connection 104 with an on-line merchant 102, and is in process of selecting products for purchase. This person is termed a buyer for convenience, and may be called a client, a customer, or by another term depicting a person who endeavors to purchase goods or services, even though there may be no transaction accomplished at the time shown in FIG. 1. The Internet connection may be by any known practice or process, and is not limited to a PC and a land-line connection. The connection may be wireless, and the appliance used may be a laptop, a PDA or other hand-held device or appliance with Internet connectivity.

As is the case with most on-line merchants, payment options include at least use of a valid credit or debit card. There may be other options as well, such as a purchase order and bill-me-later, or arranging payment with a third party. In the system illustrated by FIG. 1 there is yet another payment option at merchant 102 available to buyer 101. That option is a hyperlink labeled NOCA 107, which initiates services of a payment and credit-option site 103 of the same name (in this example). NOCA is, in this example, a name to represent a host providing services according to an embodiment of the present invention. That name might well be different in other embodiments.

When and if a buyer of a product or service initiates hyperlink 107 (or otherwise initiates a request to pay by NOCA), software 108 executing at the merchant's site interacts, in one embodiment with software 109 executing on the buyers appliance to open a connection 105 with NOCA site 103, where services may be provided through software 110 operating on the NOCA site. Software 109 in one embodiment is a browser re-direct or a browser plug-in, that may operate with any of the well-known browser software currently in use. In some other embodiments some communication may be accomplished between merchant 102 and NOCA site 103 over a direct connection 106. In a preferred embodiment transactions are processed through the buyer site so persistent tokens may be accessed, user identity may be challenged, and to negotiate and validate terms and conditions of various transactions of which the buyer may be a part.

In a broad sense NOCA operates to authenticate the buyer (in this embodiment using at least information from the merchant to authenticate the buyer; such information could consist of user's prior transaction history with the merchant which is passed to Noca as a single score), to assess the credit-worthy status of the buyer once authenticated, to provide, directly or through a set of lender(s) 111, payment to the merchant for goods and services in the buyer's online shopping cart for purchase (assuming, of course, credit worthiness), and subsequently in some embodiments to assist the buyer in making payments on credit extended through the NOCA site.

NOCA operates, however, quite differently from traditional credit sources.

In one embodiment, NOCA associates with a set of lenders 111, illustrated in FIG. 1 as Lender 1, Lender 2, through Lender n. There is no limitation as to the nature of the lenders, as the term may encompass enterprises (or even persons) willing to cooperate with NOCA to pay for products and services on behalf of buyers, and to be repaid directly by the buyer per terms and conditions established between the buyer and buyer's lender of choice with interest, or by NOCA, through NOCA managing transactions between the buyer, the merchant and the lender. NOCA will in many embodiments facilitate money (or other value) transfer between the buyer and the lender, but NOCA itself is not underwriting the transaction(s) in any preferred embodiment.

Lenders 111 may be banks or credit unions, but may also be enterprises of many other sorts, and may also be persons who are legally authorized to underwrite the buyer's purchases with respect to the pertinent laws of extending credit and underwriting, as applicable. An object is to create and maintain opportunities for a large number of enterprises to be able to offer credit to buyers in such situations. In some embodiments the relationship between NOCA and lenders may be in the nature of an ongoing auction wherein lenders compete for underwriting credit for buyers. In other aspects there may be many other criteria upon which a lender may be selected to underwrite payment to the merchant on behalf of the buyer.

FIG. 1 illustrates interrelationships between a buyer 101, a merchant 102, NOCA 103 as a credit, payment and settlement service, and a perhaps variable set of lender(s) 111. Merchant 102 in this example has previously consummated an agreement with NOCA, and therefore has software that enables the merchant to offer NOCA services to buyers on merchant's site 102, facilitated by software 108 provided in a preferred embodiment by NOCA.

At the point of purchase, there may be any one of several different circumstances. In one case for example, the buyer may be a new buyer for the particular merchant, therefore having no transaction history with that merchant, may have no history with other on-line merchants, and may also be unknown to NOCA. In this case the following steps may take place:

1. Buyer 101 logs on at the merchant's site 102. Some sites only sell if a new buyer establishes an account. Others may offer a way to select and purchase products without an account. We will assume in this case that an account is required, and this buyer provides all the necessary information, including establishing a username and a password. At this point the buyer may select items to purchase, but of course will not have a purchase history with this merchant, or other on-line merchants.

2. The buyer completes selections and is at the shopping cart level in the purchase process. At this point the buyer chooses NOCA's payment option 107.

3. NOCA 103 gets information about the buyer from the merchant and enrolls the buyer in NOCA's system by creating an account. Information for creating such an account is either obtained from the merchant's system, which might already have all or some of the information about the buyer, and/or directly from the buyer. The information is stored in a data repository 112, which may operate with a database, in a manner similar to the creation of the account on the merchant's site. (and perhaps asking the buyer to add in a PIN which can be used as a one-time password to authenticate the buyer at a later visit to NOCA's website.)

4. The enrollment transaction creates an account for the buyer at NOCA, and a profile for that buyer in repository 112.

5. At this point NOCA can do one of two things, either (a) Offer the buyer only a Debit payment or (b) compute a credit score for the buyer and if the credit score is within range offer the buyer a Credit and a Debit option. Computing credit score: As there is no purchase history for this buyer, either at the merchant 102 or at other merchants which may be associated with NOCA (NOCA can poll these other merchants as a part of the process), NOCA has to access more conventional sources, such the buyers history with conventional credit services and inclusively from other databases available commercially to check a person's credentials. NOCA, in such an instance, may also elicit additional information from the buyer, and in this process will attempt to elicit sorts of information that may be checked and verified online, such as home ownership, purchase contracts for major items like automobiles, and so on. In one embodiment NOCA gets the identity information from the merchant and interactively does a lookup on certain databases about the buyer using all or subset of the following fields: First Name, Last Name, Telephone Number, Physical address, Email address (And optional DOB, or DOB with year being optional). The databases that are looked up may be those available commercially, and the lookup is done interactively in near real-time. This is a software-driven automated process, accomplished in a sub-second period. Given the results of the lookup a risk score is assigned that will allow the merchant or the lender to decide whether or not to underwrite the transaction. If a reliable score is not be established the buyer will be offered the Debit option instead.

6. Once a credit score is established, under some circumstances that score may be shared with merchant 102, and perhaps with other merchants associated with subscribers to the NOCA service. Now, assuming that the buyer has been found to be creditworthy, NOCA arranges either with the merchant, who may extend credit, or through the network of lender(s), payment for the items selected by the buyer. In the case of the lender, the determined credit score may be shared with individual credit scores of the lenders as well. In most instances the payment to the merchant is arranged with one, of the network of lenders. More about the process of selecting a lender is described below.

7. Now that the buyer is enrolled in NOCA and the buyer's credit transaction is complete, the buyer has been extended credit by a selected or preferred lender, and the buyer will need to settle the debt. At the end of each month typically the buyer will receive an email asking the buyer to click on a link that will take the buyer to their statement listing all the transactions that are due by the end of the month, and having an interactive interface for the buyer to select various options.

8. The buyer may either make the payment or payments in full or pay a minimal amount.

9. In some cases the buyer may consolidate payments for different merchants, or may maintain separate accounts. Also, options may be extended for the buyer to select payment dates, and other configuration of payment options. The buyer will have at least two choices of making the payment or payments, either making an Automated Clearing House (ACH) transaction or using an online bill pay service.

10. Once a payment is processed the account is either settled in full, or if a partial payment is made it will not be less than the monthly interest on the outstanding balance, and the buyer will carry the outstanding amount as a loan from the lender. It is to be emphasized here that the payment plan is paying back the lender, with interest. The merchant, in most cases, assuming it is not the merchant who extends the credit, is paid up front with money from the lender or lenders facilitated by NOCA's network.

In the case that the buyer has on online and/or offline transactional history, the buyer's risk score may be determined based on his/her transaction history with various merchants. Some basic tenets of the system in an embodiment are: if the buyer has already transacted with merchant 102 at least once, merchant 102 will likely have a profile for the buyer, and at least a short purchase history.

1. In this case the NOCA system determines the identity of the buyer and verifies authenticity online. This process is accomplished substantially or completely online using a standard web browser interface. The buyer signs up at a merchant site using merchant site sign-in procedures (e.g. username, password) and the merchant authenticates the buyer and relays the authentication information to NOCA with a unique id (without passing the password).

2. In preferred embodiments the connection between NOCA and the Merchant is not just encrypted but also digitally signed, hence secure.

3. Once the buyer is authenticated the available transaction history for that buyer is relayed to NOCA. If the merchant prefers to not relay the transaction history, the merchant may use a NOCA "risk scoring" service, which is made available by NOCA as a web service, to interactively score the risk for the buyer based on the transaction history—without necessarily transmitting the complete (or even partial) transaction history of the buyer to NOCA.

4. Once NOCA has a risk score from information provided by merchant 102 about the buyer, NOCA will then calculate an aggregate risk score based on this one and other risk scores from other transaction histories with other merchants in the system.

5. If the buyer has never transacted with the merchant but has transacted with one or more merchants in NOCA'S system then the same process may be followed as in the previously-described process (above), with the exception that the lender and/or merchant will get a score from NOCA and can decide to offer credit or not.

6. In some embodiments an algorithm to calculate the actual risk score may rely on one or more of considering number of transactions, size of each transaction, frequency of transactions, time of earliest transaction and inter-transactional duration and, in some cases, other parameters from other online databases, such as median income in the zip code demographic, length of stay at current address, previous addresses, and so forth.

The situations described above attain in cases mostly where potential buyers are not fully integrated into the overall NOCA system, which includes all of the on-line merchants who are associated with or subscribers to NOCA, and the lenders likewise associated. As the system matures, however, there will be a large number of merchants, lenders and buyers in full association in the NOCA system. In the mature case many, if not most buyers, selecting NOCA at a merchant site will be regular customers of that merchant or at least of other merchants in the NOCA system, and will be enrolled as NOCA associates. The process is quite automatic in this case, and may be a "one click" process. When such a buyer selects the NOCA option the payment to the merchant is nearly instantly made and the account balance at NOCA is incremented.

Even for existing users of NOCA system as buyers, regular reassessment of credit worthiness can be done, and buyers are kept informed of current status. VIP treatment may also be established for buyers who are highly rated, and special purchase programs, discounts and the like may be offered. In some cases buyers may establish preference profiles with NOCA, and NOCA may mine information from associated merchants and other sources as well, and alert buyer associates of good deals and special purchase opportunities according to the buyer's preferences. This system may also be planet-wide, and buyers may be apprised of purchase offers for travel and other services beyond just specific products. This sort of service may extend to airlines, hotels, tours, indeed to almost anything that mat be for sale.

In some cases a buyer may be denied due to a low credit score. In such a case, in one embodiment NOCA will have a service for helping that buyer become a fully accredited associate of NOCA, by explaining diplomatically how the system works, where the problem lies, and how the problem may be overcome and corrected. Specific programs may be offered, either by NOCA or by associated third parties, to help people become associated to be able to partake of the considerable advantages of being a NOCA associate.

In the descriptions above it may seem that transactions are handled one-at-a-time and incrementally. Actually, in a fully mature system, hundreds of thousands of transactions may be approved and accomplished each day, or even more. An individual lender may approve and fund, for example, several thousand payments to merchants in a particular day, and buyers may make thousands of payments to NOCA that are to accrue to that same lender.

The descriptions above apply specifically to on-line buyers and systems. It is well-known, however, that only a relatively small portion of the world-wide population shops primarily on-line, and the greater portion do not; yet nearly everyone shops somewhere.

Figure 2:
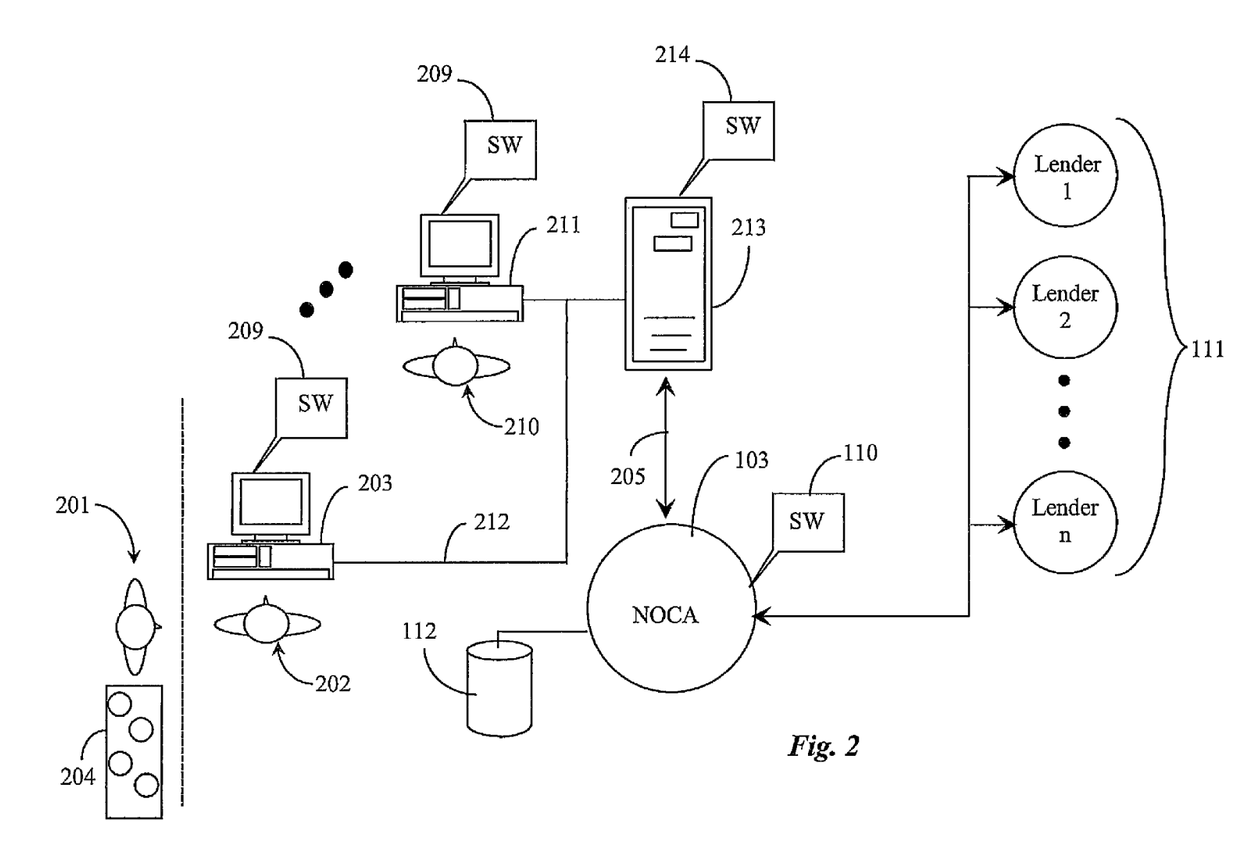
FIG. 2 is a high-level architectural diagram for practicing the invention in an alternative embodiment.

FIG. 2 is a high-level architectural diagram illustrating practicing the invention in the case of buyers shopping in brick-and-mortar stores, in addition to or in lieu of online shopping, such as well-known department stores. It is not necessary that a person be on-line enabled to be a buyer associated with NOCA, and to have access to the advantages of that association. It is also true that a person may be a NOCA associate on-line, and also enabled to take advantage of NOCA advantages when shopping in conventional environments, and even in buying gasoline, purchasing big-ticket items, or even in real estate transactions.

In FIG. 2 a buyer 201 has selected items to purchase from displays at, for example, a department store, and has presented these items to a clerk 202 for purchase. In the conventional situation clerk 202 would compute the total, including applicable taxes, and elicit from buyer 201 desired payment type, which conventionally might be by credit card, debit card, check, or cash.

In an embodiment of the present invention the department store's local system, operating for example on server 213, connected in one example to check-out stations, such as stations 203 and 211 (with clerk 210 in attendance) by a local area network (LAN) 212, is enabled by NOCA, and may operate software 214 as a NOCA client or subscriber through terminal 203 via LAN 212 and server 213, the terminal operable by clerk 202 at the check-out station.

In one instance assume that buyer 201 is an enrolled NOCA user. In this instance buyer 201 will have a transaction history with the store (merchant), or at least with other merchants, either on-line, conventional, or both, and NOCA will have a record most likely sufficient for validation for nearly real-time transaction. Buyer 201, having selected items 204, tells clerk 202 he wishes to pay by NOCA. There needs to be a mechanism for verifying this buyer as a NOCA user. In one embodiment the buyer may have a NOCA ID card, which in some cases may be a smart card with more than a conventional magnetic strip. In this case the buyer or the clerk may interface the ID card to a reader terminal connected to the merchant's digital system, and software 209 and 214 will cause information on the smartcard to be sent to NOCA. At NOCA, the ID is confirmed, the creditworthiness is confirmed, a payment increment sufficient to pay for items 204 is created, and payment is made, or at least authorized, to the merchant of FIG. 2 by NOCA. At the same time the buyer's account at NOCA is updated to add the new amount to the buyer's debt, along with detailed information for the time of purchase, the items purchased, and so forth.

The description just above that "payment is made to the merchant" means in this instance that data at NOCA (and at the merchant) is at least updated as to the fluid account between the enrolled merchant and NOCA, so that the payment is accounted for. Actual payment may well be made by, for example, funds transfer from one account to another at some period, such as once every twenty-four hours at some agreed-to time in the early morning hours. When such payment is made, data is attached and associated to the account for all identities, products and services provided, and so forth, so accounts are completely reconciled on both sides. In some cases this accounting and transfer may occur by agreement not with the specific merchant where the sale took place, but with a regional headquarters or a parent corporation of the merchant.

There may be a variety of ways identity is established and verified for a buyer under different circumstances. Such ID may include one or more of many known ID verification methods and apparatus, such as fingerprint scan, iris scan, voice print, password code, OpenID and many more. The smart card example is just one example of how ID may be established.

We may also assume the case where a buyer does not transact with any merchants on line, and has no online history. Many people are still wary of Internet commerce, but may still benefit from NOCA association. In such cases enterprises, like the department store described above with reference to FIG. 2, may enroll with NOCA and become enabled, just as shown in FIG. 2, and may inform their customers of the possibility of NOCA association, and the potential advantages of such association. So a customer (buyer) may fill out an application at a brick-and-mortar merchant, which the merchant will upload to NOCA. One the buyer is enrolled at NOCA and credit worthiness is established, that buyer may be issued suitable ID to transact as a NOCA-enrolled associate.

In a broader sense, enterprises other than brick-and-mortar retail outlets may avail themselves of the advantages accruable to NOCA associates. Think contractors, doctors, lawyers, real estate firms, flea-market sellers, travel agencies, door-to-door sales persons, and just about every case of someone with something to offer to someone else who might buy, creating a transaction. Also in a broad sense, commercial enterprises, or anyone who has something to sell, and persons who purchase may be elicited in just about any way to become enrolled with NOCA.

Figure 3:
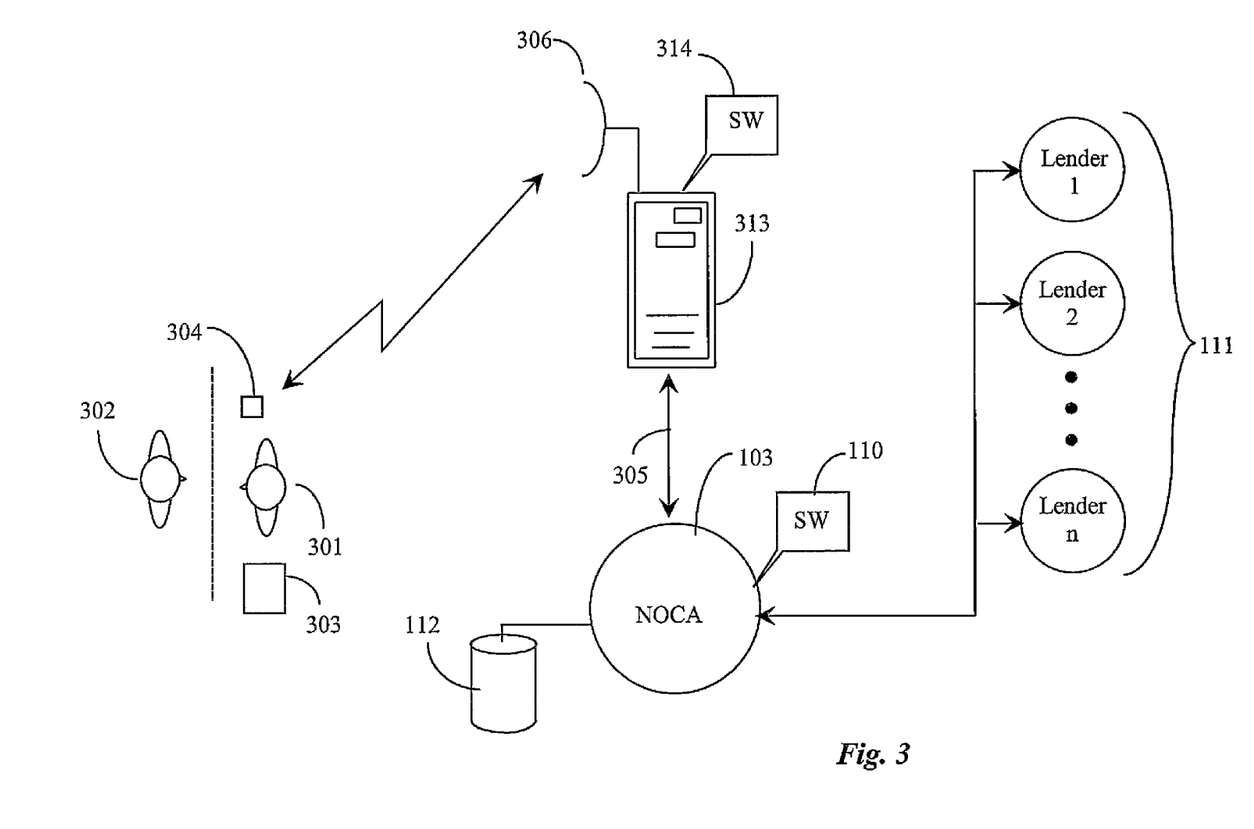
FIG. 3 is a high-level architectural diagram for practicing the invention in yet another alternative embodiment.

FIG. 3 is an architectural diagram depicting a door-to-door sales person 301, who is an enrolled NOCA seller, at the door of a potential customer 302, who is an enrolled NOCA buyer. Salesperson 301 has articles 303 for sale, and buyer 302 agrees to buy. Salesperson 301 carries a hand-held, wirelessly enabled device 304, which connects wirelessly to a server 313 via antenna 306 and other apparatus and software not shown. That is, the hand-held device may connect through a cellular telephone system to a public land-line system, then to the Internet to connect to server 313. Buyer 302 has a NOCA ID, such as discussed above, which may be transmitted via device 304 to server 313, which by virtue of software 314 and a land-line connection 305, may communicate to NOCA 103. The wireless device may be a laptop computer, a personal digital assistant (PDA), a Blackberry device, or a cellular telephone, among other sorts of devices. In some cases the device will communicate with a base station on the way to server 313. Also in some cases the transaction might be enabled by a cellular call to a call-center operated by or for NOCA, and transaction may be by voice with a real agent, or with an interactive voice response system (IVR). In some cases the transaction may be over the Internet and in others not. The requirement is that the details of the transaction between the buyer and the seller get communicated to NOCA, and NOCA does the rest, as described for other embodiments above.

At service stations there may be equipment installed for a NOCA-enrolled buyer to provide identity, and gasoline purchases may be added to a buyer's NOCA account. Sellers in booths at flea markets and the like may operate much as depicted above for door-to-door salespersons.

An enrolled buyer in NOCA will have a profile that may be updated in repository 112 on a regular basis, both by the buyer and by NOCA. An active profile for an enrolled buyer will comprise contact information, the buyers secure ID, the buyer's current credit score, transaction histories, and much more, and may also comprise a set of thresholds, related perhaps to credit score, for what total indebtedness the particular buyer may incur with NOCA and still be approved quickly and regularly for purchases. In some cases a threshold will be set for certain kinds of purchases, such as real estate. As an example, a particular buyer may be approved to purchase real estate, or not. And if so, there may be a threshold above which a purchase may not be approved. The same sort of criteria may attain for other high-ticket purchases, like automobiles and trucks. A VIP buyer, who may be quite wealthy, may be approved to buy just about anything and everything, but regular and ongoing maintenance on the profile will still be done.

With the above teaching in mind it should be clear that essentially the entire life of financial transactions of a person may be handled in NOCA. One person may consolidate bills and purchases at will and in any one of many ways through NOCA.

There is no impediment to a single person being enrolled as both a buyer and seller in NOCA. In fact, in one aspect there may be a category of NOCA Buyer/Seller. So, in another aspect of the invention, in a mature system, where there may be, for example, millions of enrolled persons and other entities, the same persons may buy and sell essentially anything through NOCA. An enrolled Buyer/Seller, for example, may, instead of planning a yard sale, may offer used items for sale through NOCA, to other Buyer/Sellers, and Buyers. Software 110 at NOCA may be enabled to list and display such items for sale, which are not limited in form, but may be categorized in certain ways, and offered for sale in a variety of ways. A Buyer/Seller may sell his house or his car, which may be purchased by an enrolled buyer, and financing may be arranged through the set of lenders 111.

In yet another embodiment of the invention, resellers may use NOCA services to buy stock for resale from wholesale suppliers. Such activity may be handled by software 110 at NOCA, with special attributes for such situations. Businesses may buy goods and services for operation as well, such as stationary, furniture, et al. through NOCA, and in the cases where financing is necessary, the same may be arranged through the set of lender(s) 11, and maintenance of such accounts may be entirely at NOCA or at the lender, or both, with account reconciliation periodically. All sorts of business-to-business services may be thus provided.

Another Option

In yet another aspect of the invention an additional option is provided for consumers (buyers), especially for on-line transactions. It was described above, relative to FIG. 1, that a merchant site might have a NOCA option (which may be labeled with a different company name or enterprise identity). In another embodiment the choices may be more specific, as illustrated, for example, by FIG. 4, which is an illustration of an exemplary interactive payment window 401 displayed on a desktop 402, that might be presented at a merchant site.

Figure 4:
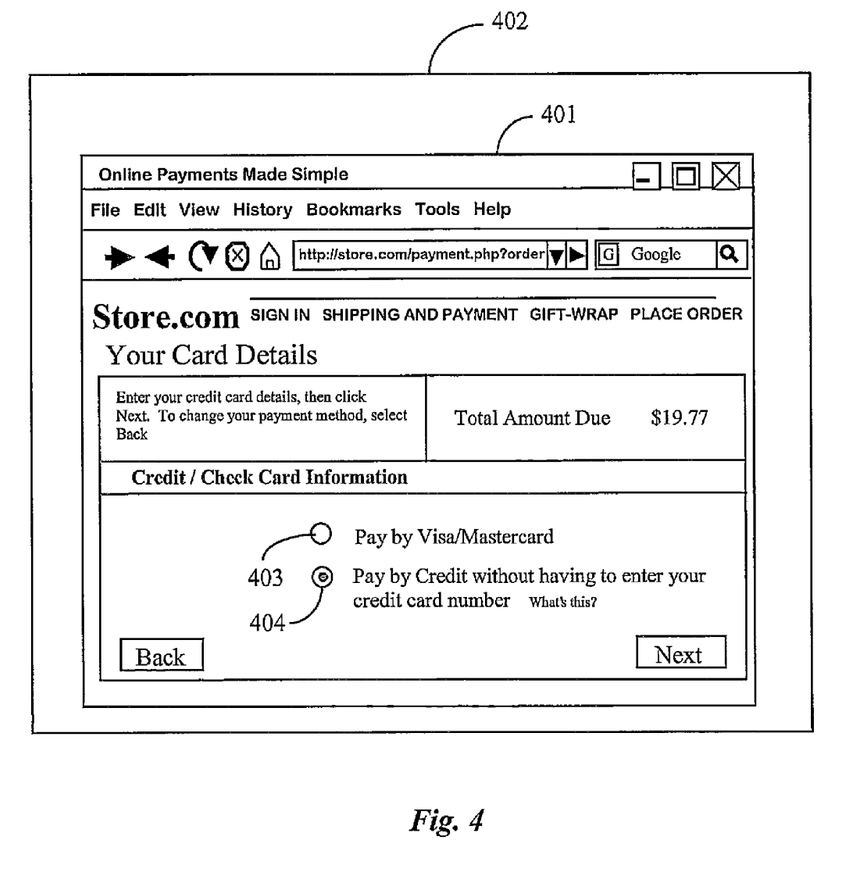
FIG. 4 illustrates an exemplary payment window that might be presented at an online merchant site.

In this option the buyer is presented with two radio buttons 403 and 404 (might be check boxes). One is to pay be credit card, the other to pay by credit without having to give the merchant (us) your credit card number. The second option, hosted by an enterprise providing services according to an embodiment of the present invention, initiates services providing credit without a need for entering credit card information.

For online transactions traditional credit card payment systems rely on the buyer either manually inputting or storing their credit card number at the merchant site or at a third-party site accessible to and trusted by the end buyer. In this embodiment of the invention, if the buyer chooses the "no credit card" option, the buyer is instead taken to a next screen where he/she is presented with terms and conditions of credit being offered. The "next screen" is not shown, but is an interactive window as in FIG. 4, but one that presents information for the potential buyer regarding terms and conditions for extending credit. If the buyer accepts the terms and conditions, he/she is issued credit from an issuing institution, such as a bank, based on a risk profile unique to that buyer. In this process the buyer is identified by NOCA, accessible data is retrieved to determine a risk profile or score, that score is sent to at least one, but possibly more than one lending institution, which, if the institution finds the buyer creditworthy, enables a credit offer for the buyer. Alternately the information from lender(s) may be cached at NOCA's servers and thus the credit decision making could happen in real-time on NOCA's platform without the need to communicate with the lender(s). The terms and conditions shown to the buyer reflect the terms and conditions the lender(s) is willing to offer credit to the buyer, who is not party to the calculations on his or her behalf behind the scenes, that is the process is transparent to the buyer.

When the buyer selects the "no credit card" or an alternately named option, identity is verified using an aggregate system which relies on the buyer's registered credentials with NOCA, with the transacting merchant as well as possibly other merchants—all aggregated and verified in real-time—obviating the need for buyer to supply a traditional 16 digit card number.

For example, in one embodiment:
1) The system determines the identity of the buyer and verifies authenticity online. This process is accomplished substantially or completely online using a standard web browser interface. The buyer signs up at a merchant site and the merchant authenticates the buyer and relays the authentication information to NOCA.

2) In preferred embodiments the connection between NOCA and the Merchant is not just encrypted but also digitally signed, hence secure.

3) Once the buyer is authenticated a transaction history or transaction history score for that buyer is relayed to NOCA. Hence the buyer is authenticated without the need to have a 16 digit card number.

In some cases the buyer may be well-known to NOCA and to the merchant, and may have a profile already indicating credit worthiness, and a quantitative threshold as well. In this case approval may be very quick, and the transaction can proceed rapidly.

If the buyer has never transacted with the merchant but has transacted with another merchant in NOCA's system then the same process may be followed as in the previously-described process (above), with the exception that the Merchant will get authentication from NOCA for the buyer.

If the buyer has never transacted with the merchant and the buyer never transacted with any other merchant in the NOCA system:

1) In one embodiment NOCA gets the identity information from the merchant and interactively does a lookup on certain databases about the buyer using all or subset of the following fields: First Name, Last Name, Telephone Number, Physical address, Email address (And optional DOB, or DOB with year being optional)

2) The databases that are looked up are those available commercially, and the lookup is done interactively in near real-time 3) Given the results of the lookup a risk score is assigned that will confirm or deny the authentication of the buyer.

Figure 6:
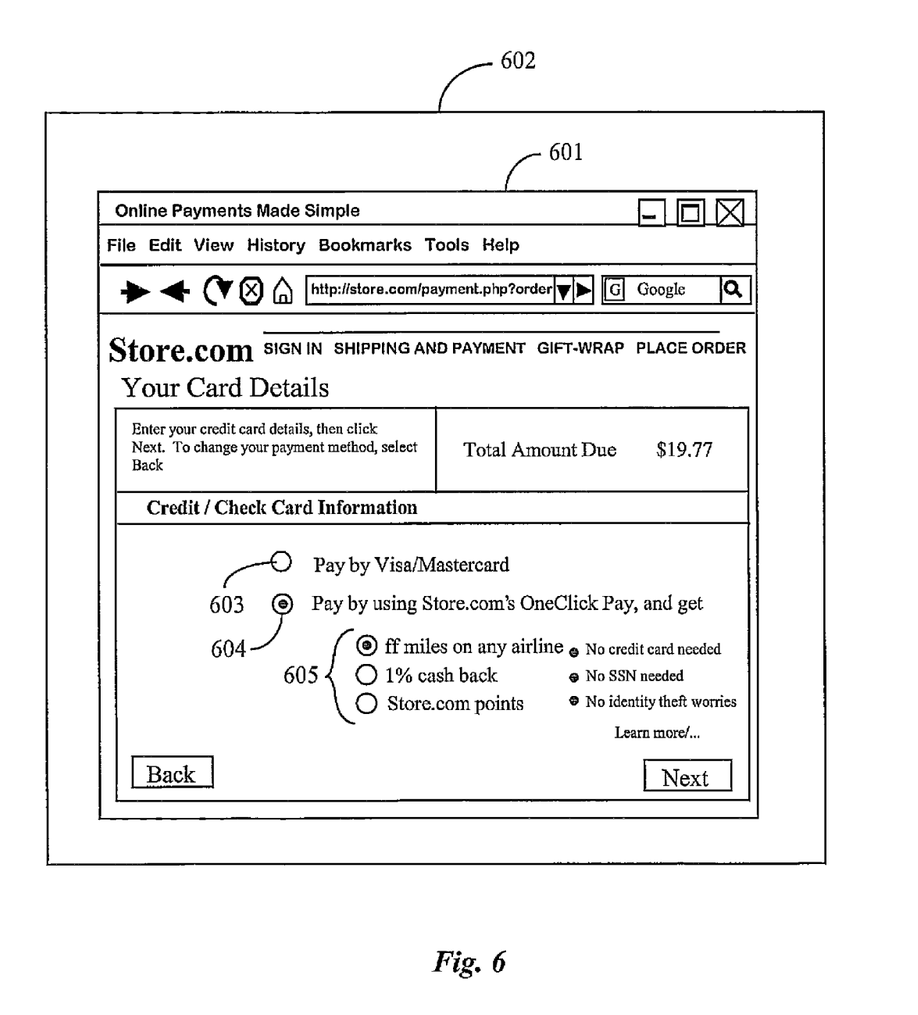
FIG. 6 illustrates an exemplary payment widow in an alternative embodiment of the invention.

FIG. 6 is an illustration of an interactive window 601 displayed on a desktop 602 for enabling a buyer to select payment options in an alternative embodiment of the invention. In this embodiment the buyer still has the option of paying by credit card, selecting radio button 603 in this example, but is offered an option by radio button 604 to use the "no credit card" option. Buttons 605 illustrate selection for incentives for the buyer to use this option. The buyer may select, for example, frequent flier miles on an airline of the buyer's choice, 1% (or some other percentage) cash back, or points which may in future be redeemed for other value. There is no credit card needed, no social security number needed, and no worries about identity theft through a credit card number.

Chargebacks

In embodiments of the present invention, when a buyer transacts online, NOCA logs the transaction with a tracking ID that will uniquely identify that specific transaction with the merchant, with NOCA and with the buyer.

Chargebacks are defined as transactions on a buyer's credit statement that the buyer's dispute with the merchant. There may be many reasons motivating a need for a chargeback, therefore in embodiments of the invention mechanisms are put in place to resolve almost any issue between the buyer and the merchant. An online chargeback dispute resolution system is initiated that connects the buyer, the merchant and the credit institution online, seamlessly, enabling dispute resolution and tracking. In one embodiment of the invention the process works as follows:

(A) When a buyer transacts with a merchant online NOCA will record the transaction details including description of item(s) and shipping information. This information will be recorded as part of the transaction process if and when the buyer selects NOCA's payment system as the payment option.

NOCA will use the information recorded to query a shipper's online systems using publicly-available Application Programming Interfaces (APIs), and track delivery and receipt. NOCA may, subsequent to delivery and receipt of the shipped good(s) and/or service(s) by the buyer, send an electronic confirmation request or survey. This electronic confirmation request/survey may be sent as an email with an interactive form that the Buyer can respond to, the responses of which will be received by NOCA online and summarized in its database. These responses may or may not be shared with the originating Merchant.

Should a buyer wish to dispute goods or services received from the Merchant the buyer can log in to the NOCA website and click a "dispute" button, then submit a dispute request. The dispute request will be tracked online by NOCA and will be resolved with the Merchant using the tracking data collected by NOCA during the delivery of goods and/or services. Since NOCA will have the tracking data, this process will alleviate all the false disputes based on missed-delivery or non-receipt of delivery. In addition it will provide a way for the buyer to track the dispute status and resolution online.

Deriving Buyer Identity

In one embodiment of the invention a method and system is provided for using a buyer's existing identity by NOCA (which, as described above, may have different names in many other embodiments) with an online merchant for processing a payment transaction. This obviates a need for the buyer to provide additional payment system details and/or Identity associated with such a system. This unique system retrieves or derives a buyer's identity from an existing identity with in an online merchant's data repository and uses it for processing payment of the buyer's transaction with the online merchant.

In this unique system the identity can be used either as is or with augmentation of additional data either residing at NOCA or data which NOCA has access to from third parties. Getting/retrieving buyer identity from an online merchant in near real time for processing payment of an online transaction obviates any need for the buyer to re-input identity for the payment system. In addition, this identity, either by itself or augmented further using information available to NOCA, may serve as a basis for authenticating the buyer as well as determining the buyer's risk score (transaction amount authorization) for a financial institution underwriting the transaction (providing credit).

In a preferred embodiment all of this processing takes place in real-time before the buyer, in the online process, reaches the checkout option. The online merchant gets a response from NOCA as to whether the buyer is authentic and has a credit worthy score. If the buyer is credit worthy then the merchant may also gets an upper limit up to which the bank, or other credit-providing institution, is willing to underwrite the transaction.

Definitions

Buyer—an online entity (usually a person) that will initiate an online or an offline transaction. If the transaction is online NOCA will log the transaction with a tracking ID that will uniquely identify the transaction with the merchant, NOCA and the end buyer. Although buyers may most often be persons, the concept extends to other entities as well, such as corporations, non-profit organizations and government entities, all of whom may initiate transactions as buyers.

Merchant—on online or offline entity that offers good(s) and/or service(s) for sale.

NOCA—online network entity/enterprise enabling buyers to transact online or offline without using credit cards. A new debit/credit payment network/service. NOCA will not have effective fiduciary control over the buyer's or the merchant's money at any financial institution, but will simply act as a network to process transactions.

The time related sequence of events in one embodiment of the invention is as follows:

For a credit transaction if the buyer has an existing account at the merchant site:

1) Buyer logs into the merchant site.
2) Merchant sends the buyer's information to NOCA, for example by using an XML data structure over secure HTTP. The information on the buyer may include, but will not be limited to First Name, Last Name, Email address, Phone number (home phone, cell phone, work phone), Home address, Date of birth and possibly SS#.
3) NOCA will authenticate the buyer information supplied by the Merchant using its own proprietary algorithm as well possibly verifying it from third party commercial databases
4) A risk score is calculated for the buyer based on transaction history supplied by the merchant and other parameters.
5) Based on the result of authentication and risk assessment a reply is sent to the merchant indicating whether the buyer is authentic, and the maximum size of transaction the underwriter of choice is willing to underwrite.
6) If the transaction amount is less than or equal to the amount approved by the underwriter the buyer gets the option to select the NOCA payment system
7) The buyer can accept NOCA's payment system and the transaction is carried through without the buyer having to supply any additional information If the buyer does not have an existing account at the merchant site:

1) The buyer might create an account at the merchant site, and the transaction could proceed in one of two possible directions:
    (1) Either the buyer supplies enough information to complete an authentication and risk assessment (typically this information would include FirstName, Last Name, DOB, Home Address, Email, Phone, Social Security #)
    (2) Or the buyer could be unwritten for a certain amount (typically a small amount). The sequence of events after this in this use case will be same as (2) through (7) in the case above where the buyer does have an account with the merchant.

For a Debit transaction the process described above can be simplified in either of the cases whether the buyer has an account with the merchant or not.

Step (1) will be same as for Credit.

Step (2) Buyer is presented a form in the image of check. The form requires the buyer to fill out bank identifying information i.e. Routing # and Account #. Should the buyer not have access to Routing # and Account # NOCA will provide a mechanism to get it in real-time by accessing the user's online bank account. Once the buyer fills out the Routing # and Account # this information will be sent (posted) securely to NOCA's servers.

Figure 5:
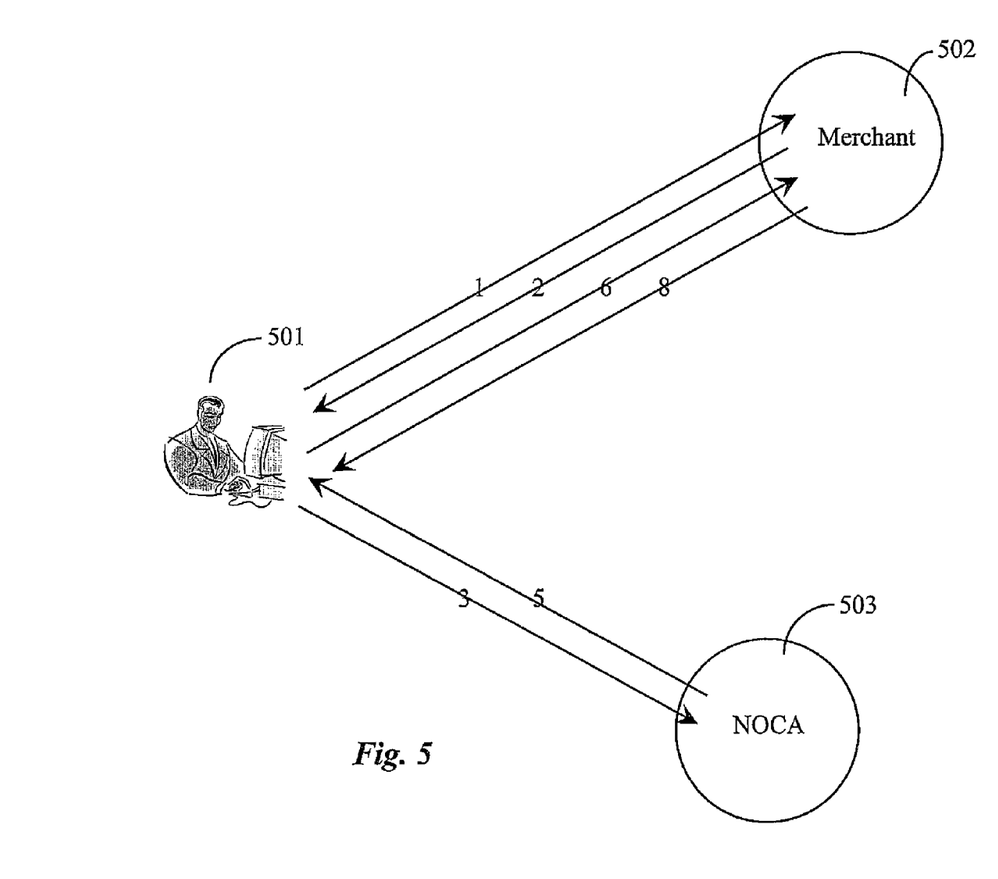
FIG. 5 is a diagram illustrating communication paths used in deriving consumer identity from a merchant in an embodiment of the invention.

FIG. 5 illustrates transaction flow involved in deriving buyer identity from a merchant. The flow of information is illustrated as lines 1, 2, 3, 5, 6, and 8 between buyer 501 and merchant 502 and NOCA 503. Firstly, by path 1 buyer 501 submits to pay by NOCA option to merchant site 502. On path 2 the merchant sends, in this case, an HTML response that auto-posts a form containing an XML payment request to the buyer's system. On path 3 the buyer's browser posts that form to the NOCA site. NOCA processes the XML payment request. NOCA crafts a HTML response and posts same to the buyer's site on path 5. The buyer's browser posts that form to the merchant site. The merchant now responds to the buyer with results.

In the process just described with the aid of FIG. 5 communication between merchant 502 and NOCA 503 is indirect, routed through the buyer's computer. In some embodiments, based on an established relationship between a merchant and NOCA, there may be more direct communication between the merchant and NOCA, such as by Internet links between the two directly.

Social Graph Manipulations

In a further embodiment of the present invention a method and system is provided for using a social graph, as known in a social network, to authenticate a buyer and to determine a credit risk score for the buyer. In this embodiment the definitions are the same as the definitions listed above, except for "social graph" and "risk score" which are defined as:

Further Definitions

Social graph—a depiction of the connections that an individual has in a social network. The number of connections, the type of connection (e.g. weak, strong etc.), the length of connection (when was the connection established and how long has it been since establishment), attributes of a person at the other end of a connection are all attributes that may constitute a social graph.

Risk score (or credit risk score)—is a normalized score that will allow an underwriter to determine a ceiling amount and a length of time (i.e. the terms) on which to extend credit to the buyer.

Each member of a social network will have a social graph, which may be uniquely used to determine a possible risk-score for an individual.

In one instance it may work as follows:

1) The individual buyer's direct connections (contacts), being those only 1 degree of separation away, are checked to see if they (the contacts) are already registered in the NOCA system.
2) If one of more of these 1 degree separation contacts already have a risk score they can be sent a notification within the social network (or outside of the social network for example, by email) asking if they are willing to vouch for the buyer in question. The terms and conditions of vouching for someone may be determined by the underwriting institution and may be binding or non-binding
3) Depending on the number of responses (affirmative, negative, neutral) NOCA may determine a risk score by an algorithm that would provide a potential underwriter to decide whether or not to extend an offer of credit to the particular buyer. In determining this risk score the abovementioned attributes of when and long a buyer's profile has been on the social network, the time and length of the buyer's contacts and which ones of the contact persons is already in NOCA's system will play a role.

In essence this is using the social graph in the social network to provide a transitive trust relationship between the buyer and NOCA; i.e. if the buyer is not a member of NOCA's system but one of the user's connected friends is, then (depending on whether that friend is willing to confirm or not that the original user is indeed who he/she says they are) the buyer could leverage his/her social graph to get a credit risk score and subsequently be underwritten by a credit provider.

In time the social graph procedure could provide a more granular risk-score when augmented with other information available about the buyer in NOCA's database i.e. information such as size, type and frequency of transactions, size, type and frequency of the connected friend's transactions etc.

Those with skill in the art will be aware that there are many alterations that might be made in the embodiments described above, without departing from the spirit and scope of the invention, therefore the invention must be limited only by the claims that follow.

I claim:

1. A transaction service, comprising:
an Internet-enabled server and coupled data repository;
software executing at the server from a machine-readable, non-transitory medium;
records in the data repository regarding a plurality of Internet-connected merchant sites as merchant subscribers to the transaction service;
records in the data repository regarding a plurality of persons associated as customer subscribers to the transaction service;
records in the data repository regarding a plurality of financial institutions and/or persons as lender subscribers to the transaction service;
wherein the transaction service, executing the software, receives a request over an Internet link from an individual one of the merchant subscribers to pay the merchant subscriber for goods or services selected for purchase at the merchant site by an individual one of the customer subscribers, consults the data repository identifying the customer as a customer subscriber, secures agreement from one or more of the lender subscribers to provide funding for the purchase, collects the funding from the one or more lending subscribers, pays the merchant subscriber for the customer subscriber's purchase, and manages payments from the customer subscriber to the transaction service, which then makes payments to the one or more lending subscribers.

2. The transaction service of claim 1 wherein a transaction history comprising information about past transactions for goods or services between the customer subscriber and the merchant subscriber is used by the transaction service as a component in determining credit worthiness for the customer subscriber.

3. The transaction service of claim 2 wherein the transaction service uses transaction history for the customer subscriber with a plurality of merchant subscribers in determining credit worthiness for the customer.

4. The transaction service of claim 1 wherein the transaction service maintains a profile for each customer subscriber, including at least transaction history with the transaction service and credit worthiness for the customer subscriber determined at different times on an ongoing basis.

5. The transaction service of claim 1 wherein the transaction service further comprises a function for enrollment of merchants, customers and lenders as subscribers.

6. A method for managing transactions, comprising the steps:
(a) receiving a request over an Internet link at an Internet-enabled transaction service provided by software executing on a server from a machine-readable, non-transitory medium, the request from a merchant subscriber to the transaction service, to pay the merchant subscriber for goods or services selected for purchase at a merchant site hosted by the merchant subscriber, by a customer;
(b) consulting a data repository, identifying the customer as a customer subscriber to the transaction service;
(c) securing agreement from one or more lender subscribers to the transaction service to provide funding for the purchases;
(d) collecting the funding from the one or more lending subscribers;
(e) paying the Merchant subscriber by the transaction service for the customer subscriber's purchases; and
(f) managing payments from the customer subscriber to the transaction service and payments by the transaction service to the one or more lending subscribers.

7. The method of claim 6 wherein a transaction history comprising information about past transactions for goods or services between the customer subscriber and the merchant subscriber is used by the transaction service as a component in determining credit worthiness for the customer subscriber.

8. The method of claim 7 wherein the transaction service uses transaction history for the customer subscriber with a plurality of merchant subscribers in determining credit worthiness for the customer.

9. The method of claim 6 wherein the transaction service maintains a profile for each customer subscriber, including at least transaction history with the transaction service and credit worthiness for the customer subscriber determined at different times on an ongoing basis.

10. The method of claim 6 wherein the transaction service further comprises a function for enrollment of merchants, customers and lenders as subscribers.

* * * * *